(No Model.)

J. FOXALL.
REGISTER FOR GAS METERS.

No. 249,329. Patented Nov. 8, 1881.

Witnesses:
J. W. Garner
W. S. D. Haines

Inventor:
John Foxall
By H. F. Ennis
Atty.

UNITED STATES PATENT OFFICE.

JOHN FOXALL, OF NEWPORT, COUNTY OF MONMOUTH, ENGLAND, ASSIGNOR TO THOMAS WALTERS, OF SAME PLACE.

REGISTER FOR GAS-METERS.

SPECIFICATION forming part of Letters Patent No. 249,329, dated November 8, 1881.

Application filed June 29, 1881. (No model.)

*To all whom it may concern:*

Be it known that I, JOHN FOXALL, a citizen of the Kingdom of Great Britain, residing at Newport, in the county of Monmouth, England, have invented certain new and useful Improvements in Registers for Gas-Meters; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to certain improvements in registers or indicators for gas-meters; and it has for its objects to simplify the construction and arrangement of such indicators or registers, so that the amount of gas consumed may be determined at a glance, as more fully hereinafter specified. These objects I attain by the mechanism illustrated in the accompanying drawings, in which—

Figure 1:
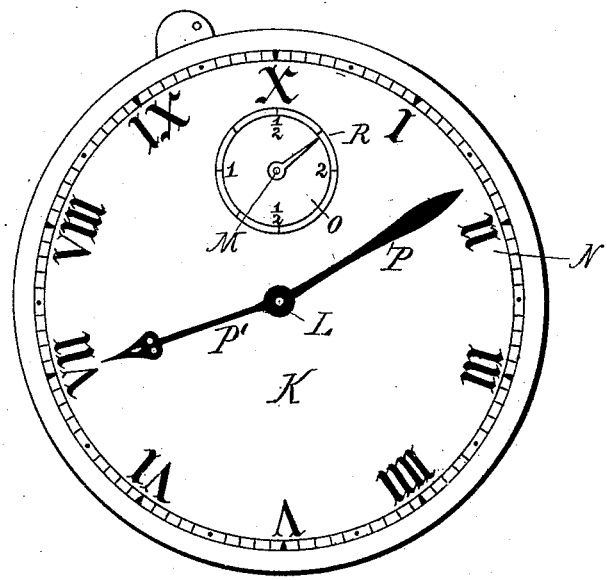
Figure 3:
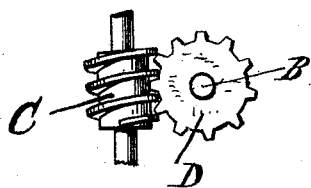
Figure 2:
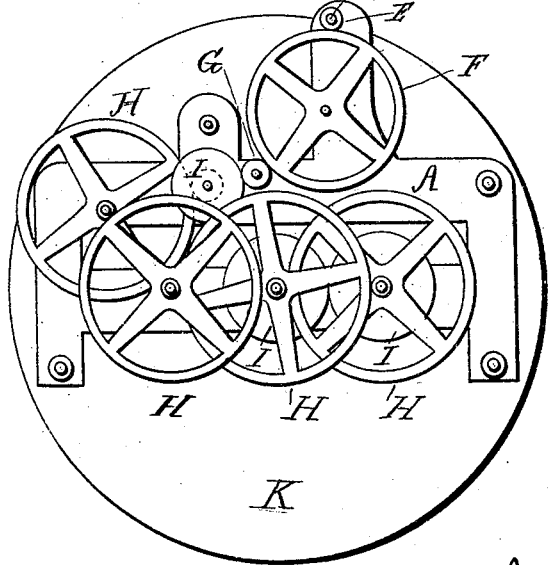

Figure 1 represents a front view of my improved indicator, showing the dial-plates and indices or pointers; Fig. 2, a rear view, showing the mechanism for operating the indices or pointers; and Fig. 3, a detached view of the worm and screw operated by the meter, and through which motion is communicated to the indicator proper.

The letter A indicates a frame secured to the rear of the dial-plate, in which the journals of the various gear-wheels for transmitting motion to the indices or pointers have their bearings.

The letter B indicates a shaft, which is fitted with an endless screw, D, which receives motion from a worm, C, actuated by the meter. The said shaft B is provided with a pinion, E, which intermeshes with a gear-wheel, F, which intermeshes with pinion G, actuating a train of spur or gear wheels, H, and pinions I, for indicating and registering the amount of gas passed through the meter. A pointer or hand, R, represents the cubic feet consumed; but its indication being limited to two feet, the hands P P' are provided to continue the registration any desired amount. Each point on the dial N, when read in reference to the hand P, representing a foot, a revolution of hand indicates one hundred feet; and as a complete revolution of the hand P moves the hand P' one point, each point on the dial N, when read with reference to hand P', indicates one hundred feet. By this means the exact amount of gas consumed can be accurately indicated. For example, in the drawings, Fig. 1, the hand P', representing hundreds, being at 7, would indicate seven hundred, the hand P, representing single feet, being at 17, and the hand R, showing three-quarters of a foot, the whole would read or indicate seven hundred and seventeen feet and three-quarters of a foot (717¾.) A peculiar feature of this register is that its record is based on the metric or decimal system, and consequently its indications of the amount of gas consumed are readily converted into dollars and cents.

I am aware that a dial provided with hands and actuated by a train of gearing driven by a worm or a revolving shaft, and constructed so as to register, is not new, and such I do not broadly claim; but in my invention I have arranged my register with special reference to and peculiarly adapted to the dry gas-meter patented to me September 27, 1881, and numbered 247,733.

Having described my invention, what I claim, and desire to secure by Letters Patent, is—

In a continuous rotary register for gas-meters the worm C and pinion D, operated by the flow of gas in the bellows, and in turn operating the gearing F, G, I, and H, in combination with the dial-plate K, having the larger dial N divided into tenths and the smaller dial O divided into quarters, and the hands P P' and R, constructed and arranged substantially as set forth.

In testimony whereof I affix my signature in presence of two witnesses.

JOHN FOXALL.

Witnesses:
GEO. J. CHAPMAN,
H. J. ENNIS.